United States Patent
Oguri

(10) Patent No.: US 6,655,226 B2
(45) Date of Patent: Dec. 2, 2003

(54) AUTOMATIC TRANSMISSION

(75) Inventor: Masami Oguri, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/158,912

(22) Filed: Jun. 3, 2002

(65) Prior Publication Data

US 2002/0178856 A1 Dec. 5, 2002

(30) Foreign Application Priority Data

Jun. 4, 2001 (JP) ........................................ 2001-167591

(51) Int. Cl.$^7$ ................................................ F16H 3/083
(52) U.S. Cl. ............................................ 74/333; 74/342
(58) Field of Search .......................... 74/330, 333, 334, 74/340, 342

(56) References Cited

U.S. PATENT DOCUMENTS

| | | | | |
|---|---|---|---|---|
| 2,777,332 A | * | 1/1957 | Nallinger | 74/368 |
| 4,667,526 A | * | 5/1987 | Young | 74/331 |
| 5,642,643 A | * | 7/1997 | Reynolds et al. | 74/333 X |
| 6,397,692 B1 | * | 6/2002 | Carriere | 74/331 |
| 6,397,693 B1 | * | 6/2002 | Umemoto et al. | 74/333 |

FOREIGN PATENT DOCUMENTS

| | | | | |
|---|---|---|---|---|
| JP | 359040046 | * | 3/1984 | 74/325 |
| JP | 362075174 | * | 4/1987 | 74/12 |
| JP | 403134372 | * | 6/1991 | 74/335 |
| JP | 6-316230 | | 11/1994 | |
| JP | 2000-65199 | | 3/2000 | |

* cited by examiner

Primary Examiner—Ha Ho
(74) Attorney, Agent, or Firm—McGinn & Gibb, PLLC

(57) ABSTRACT

An automatic transmission for a vehicle having a plurality of gear trains provided between an input shaft and an output shaft, comprises a hollow shaft coaxially including the input shaft, a forward drive gear rotatably mounted on the hollow shaft, a forward driven gear integrally mounted on the output shaft and constantly meshing with the forward drive gear, a reverse drive gear rotatably mounted on the input shaft, a changeover hub integrally mounted on the hollow shaft between the forward drive gear and the reverse drive gear, an first idler gear constantly meshing with the reverse drive gear, a second idler gear integrally formed with the first idler gear and constantly meshing with the forward driven gear and a changeover member provided between the forward gear and the reverse drive gear for engaging the changeover hub either with the forward drive gear or the reverse drive gear.

4 Claims, 4 Drawing Sheets

13 : INPUT SHAFT
14 : OUTPUT SHAFT
23a : FORWARD DRIVE GEAR
23b : FORWARD DRIVEN GEAR
27 : REVERSE DRIVE GEAR
28 : IDLER SHAFT
28a : FIRST IDLER GEAR
28b : SECOND IDLER GEAR
33a : SYNCHRONIZER HUB
33b : SYNCHRONIZER SLEEVE

13 : INPUT SHAFT
14 : OUTPUT SHAFT
23a : FORWARD DRIVE GEAR
23b : FORWARD DRIVEN GEAR

27 : REVERSE DRIVE GEAR
28 : IDLER SHAFT
28a : FIRST IDLER GEAR
28b : SECOND IDLER GEAR

33a : SYNCHRONIZER HUB
33b : SYNCHRONIZER SLEEVE

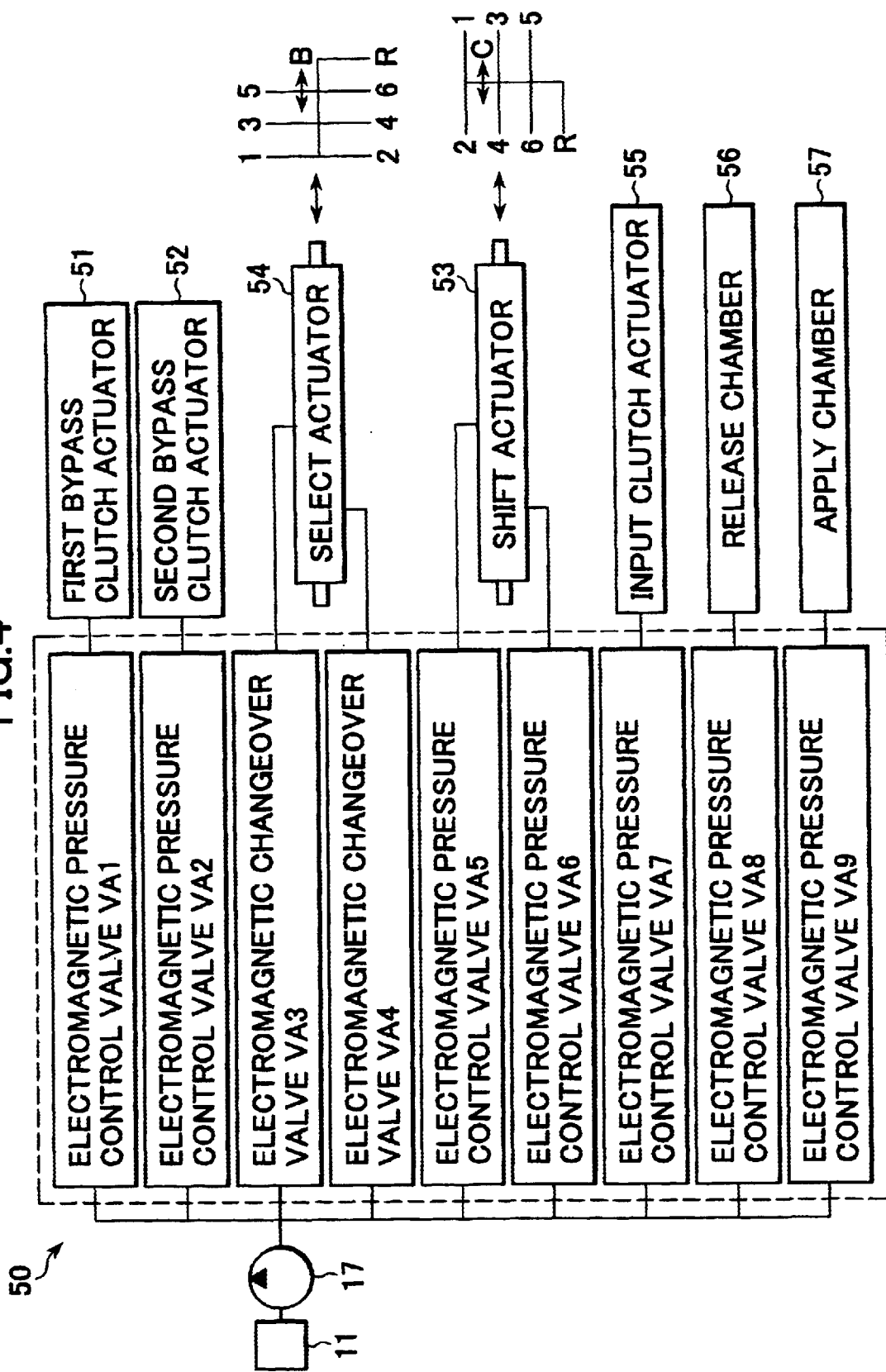

AUTOMATIC TRANSMISSION

BACKGROUND OF THE INVENTION

1. Field of the Invention

The present invention relates to an automatic transmission and more particularly to an automatic transmission having a plurality of transmission gear trains between input and output shafts.

2. Discussion of Prior Art

Generally, a manual transmission, in which the gear is manually shifted, has an input shaft directly connected to an engine and including a plurality of drive gears and has an output shaft including a plurality of driven gears paired with the corresponding drive gears and connected to drive wheels. That is, there are provided a plurality of transmission gear trains between the input shaft and the output shaft. In this manual transmission, when the gear is changed, after a clutch is disengaged, changeover mechanisms such as synchromesh mechanism are manually operated to change over paired transmission gear trains (hereinafter, referred to as just gear trains) and then the clutch is engaged. This sequence of manual operations accomplishes a gear shift of a vehicle.

The manual transmission can be converted into an automatic transmission by performing gearshiftings and clutch operations by means of shift actuators hydraulically operated. This type of transmission having a plurality of gear trains is called an Automated Manual Transmission (hereinafter referred to as "AMT"). The transmission has advantages in having a small number of components and an excellent transmission efficiency of power, compared to a conventional torque converter type automatic transmission primarily constituted by planetary gears and the like.

For example, Japanese Patent Application Laid-open No. Toku-Kai 2000-65199 discloses this AMT type automatic transmission having a plurality of gear trains provided between an input shaft and an output shaft, a changeover mechanism for changeover gear trains, that is, selecting a gear train bearing power transmission from a plurality of gear trains and a bypass clutch for mediating power transmission from the input shaft to the output shaft in a synchronizing manner with the changeover operation of gear trains.

Further, Japanese Patent Application Laid-open Toku-Kai-Hei 6-316230 proposes an automatic transmission in which an input shaft is connected with an output shaft through gear trains by selectively engaging a plurality of hydraulic multiple disc clutches provided in respective gear trains.

However, these automatic transmissions need a reverse drive gear provided on the input shaft and a reverse driven gear meshing with the reverse drive gear through an idler gear and provided on the output shaft. That is, a dedicated reverse gear train is needed, this resulting in an increase of the number of components and an enlarged space for accommodating the reverse gear train.

SUMMARY OF THE INVENTION

It is an object of the present invention to provide an AMT type automatic transmission capable of reducing the number of gears of gear trains and the longitudinal size of the automatic transmission.

To achieve the object, an automatic transmission for a vehicle having a plurality of gear trains provided between an input shaft and an output shaft, comprises a hollow shaft coaxially including the input shaft, a particular forward drive gear rotatably mounted on the hollow shaft, a forward driven gear integrally mounted on the output shaft and constantly meshing with the forward drive gear, a reverse drive gear rotatably mounted on the input shaft adjacently to the forward drive gear, a friction clutch provided between the input shaft and the hollow shaft for selectively transmitting power from the input shaft to the hollow shaft, a changeover hub integrally mounted on the hollow shaft between the particular forward drive gear and the reverse drive gear, an first idler gear constantly meshing with the reverse drive gear, a second idler gear integrally formed with the first idler gear and constantly meshing with the forward driven gear and a changeover member provided between the particular forward gear and the reverse drive gear for engaging the changeover hub either with the particular forward drive gear or the reverse drive gear.

BRIEF DESCRIPTION OF DRAWINGS

FIG. 4 is a block diagram showing a hydraulic control of an automatic transmission according to an embodiment of the present invention.

DESCRIPTION OF PREFERRED EMBODIMENT

Figure 1:
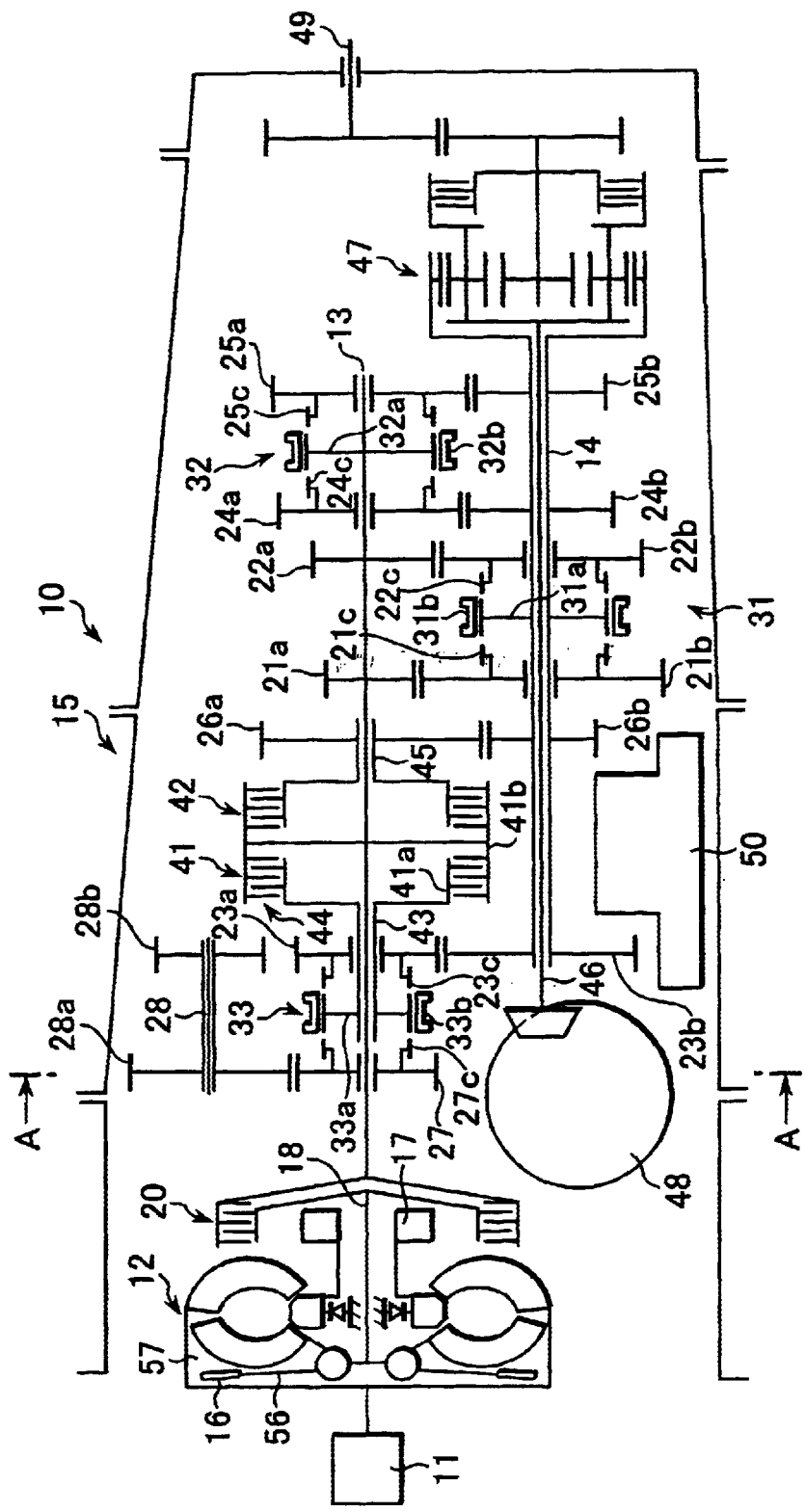
FIG. 1 is a skeleton diagram showing an automatic transmission according to an embodiment of the present invention.

Referring now to FIG. 1, reference numeral 10 denotes an automatic transmission having an input shaft 13 connected with an engine 11 through a torque converter 12 and an output shaft 14 provided in parallel with the input shaft 13 and connected with drive wheels. The input shaft 13 and output shaft 14 are arranged in a longitudinal direction of a vehicle and are accommodated in a transmission case 15. The automatic transmission is longitudinally mounted on a four wheel drive vehicle. The engine 11 is connected with the torque converter 12 including a lock-up clutch 16. The torque converter 12 incorporates an oil pump 17 which is driven through the torque converter 12. Further, an input clutch 20 is disposed between a turbine shaft 18 for transmitting output of the torque converter 12 and the input shaft 13. The input clutch 20 acts as changing over the connection of the turbine shaft 18 and the input clutch 13 between an engagement state and a releasing state.

A first drive gear 21a and a second drive gear 22a are secured to the input shaft 13, respectively. A third drive gear 23a, a fourth drive gear 24a, a fifth drive gear 25a and a sixth drive gear 26a are rotatably mounted thereon, respectively. Further, a first driven gear 21b and a second driven gear 22b are rotatably mounted on the output shaft 14 and a third driven gear 23b, a fourth driven gear 24b, a fifth driven gear 25b and a sixth driven gear 26b are secured thereto, respectively. These drive gears 21a, 22a, 23a, 24a, 25a and 26a are in a meshing state with the driven gears 21b, 22b, 23b, 24b, 25b and 26b, respectively, thus constituting forward gear trains.

Figure 2:
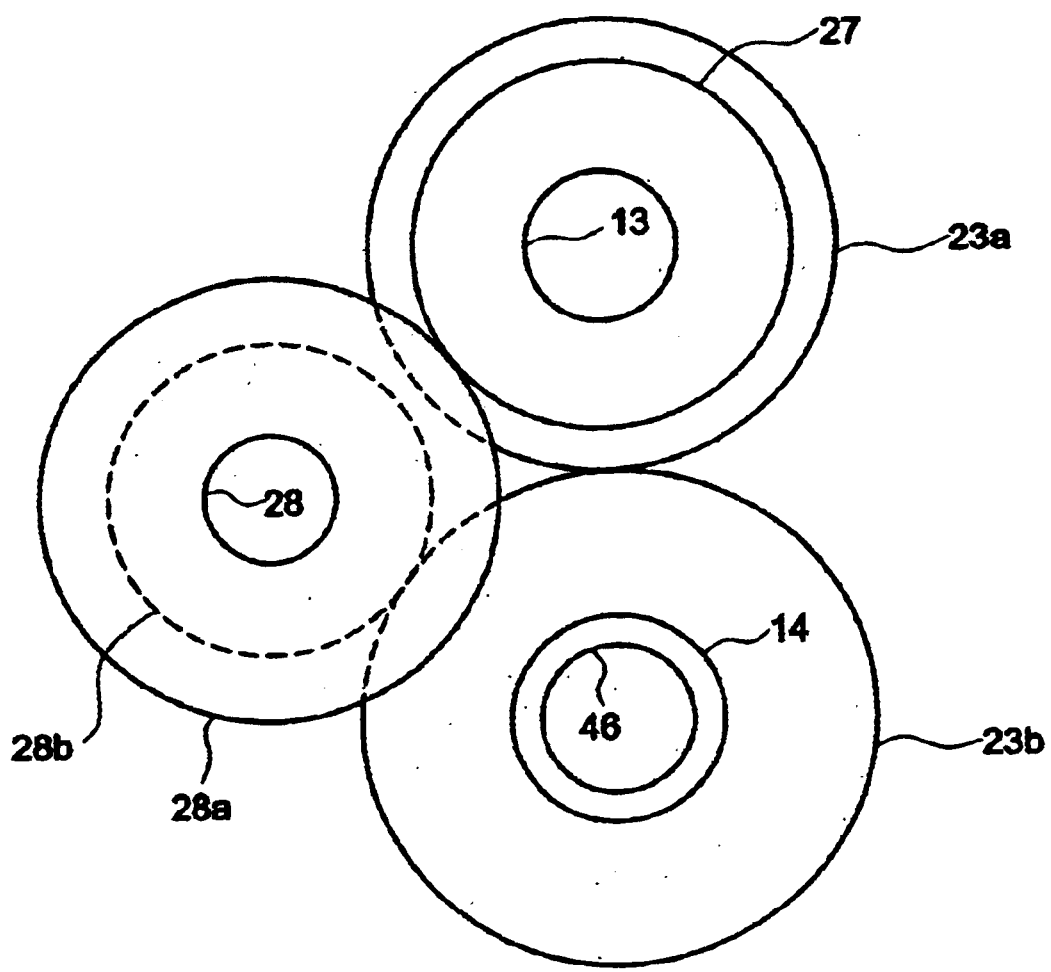
FIG. 2 is a schematic diagram showing a state of meshing of gears when viewed from a line A—A of FIG. 1.
Figure 3:
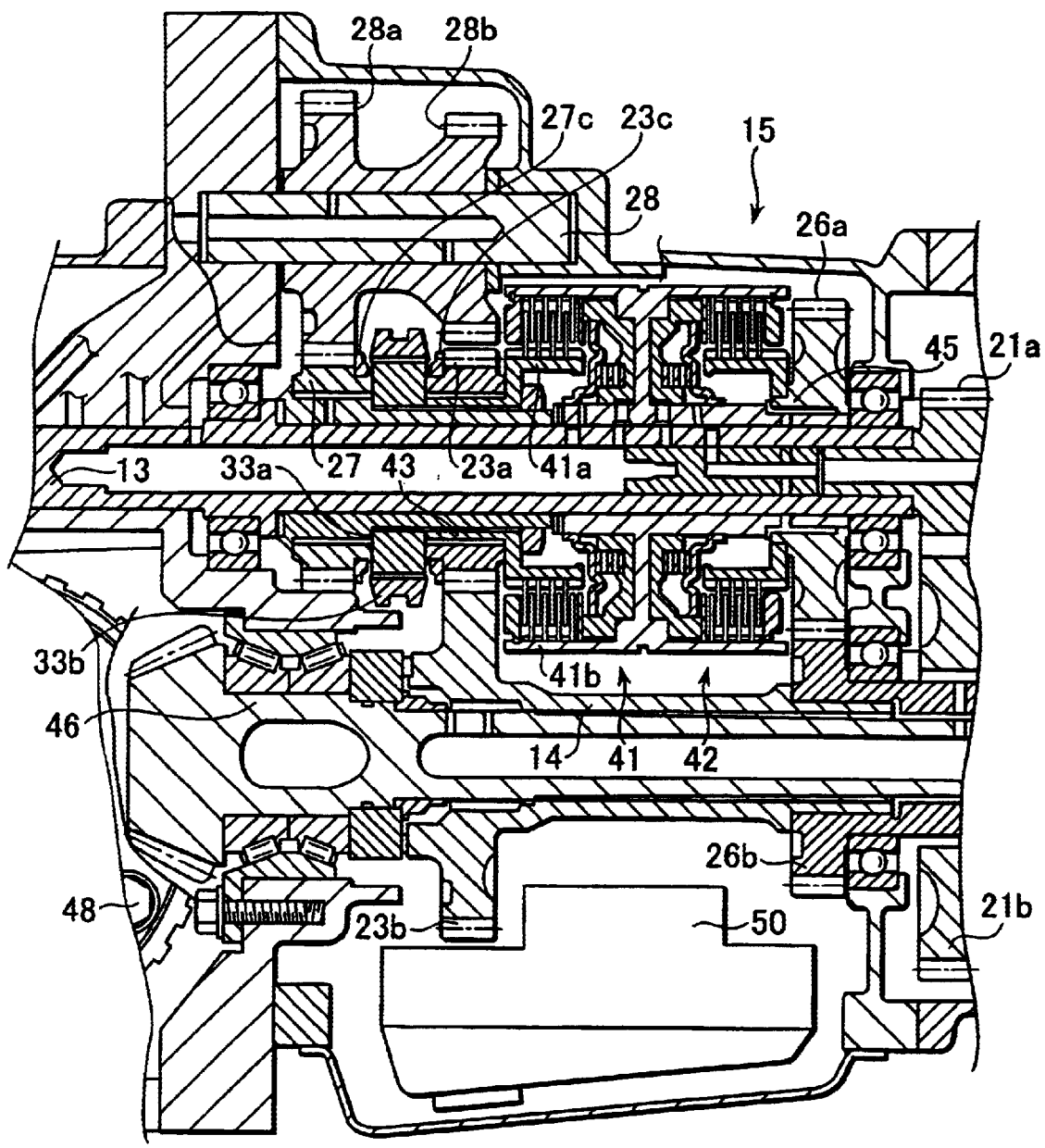
FIG. 3 is an enlarged sectional view of reverse speed gears.

A reverse drive gear 27 is rotatably mounted on the input shaft 13 near the engine 11. As shown in FIG. 2, a first idler gear 28a and a second idler gear 28b are integrally and rotatably mounted on an idler shaft 28. The first idler gear 28a meshes with the reverse drive gear 27 and the second idler gear 28b meshes with the third driven gear 23b. The number of teeth of the second idler gear 28b is smaller than that of the first idler gear 28a. That is, the second idler gear 28b has a smaller tip circle than the first idler gear 28a. According to the embodiment of the present invention, the third driven gear 23b also serves as a reverse driven gear. Thus, the reverse drive gear 27, the first idler gear 28a, the second idler gear 28b and the third driven gear 23b constitutes a reverse gear train.

A first changeover mechanism 31 for changing over from the first gear to the second gear and vise versa is mounted on the output shaft 14 and a second changeover mechanism 32 for changing over from the fourth gear to the fifth gear and vise versa is mounted on the output shaft 13. Further, a third changeover mechanism 33 for changing over from the third gear to the reverse gear and vise versa is mounted on a hollow shaft 43. The respective changeover mechanisms 31, 32 and 33 are constituted by synchromesh mechanisms including synchronizer hubs 31a, 32a and 33a, synchronizer sleeves 31b, 32b and 33b slidably provided on the synchronizer hubs 31a, 32a and 33a respectively and splines 21c, 22c, 23c, 24c, 25c, 26c and 27c integrally provided on respective gears 21b, 22b, 23b, 24b, 25b, 26b and 27b. The synchronizer sleeves 31b, 32b and 33b are synchronized with splines 21c, 22c, 23c, 24c, 25c, 26c and 27c and are engaged therewith.

Two bypass clutches, a first bypass clutch 41 and a second bypass clutch 42 are mounted on the input shaft 13. The first bypass clutch 41 comprises a clutch hub 41a fixed to the hollow shaft 43 rotatably and coaxially mounted on the input shaft 13, a clutch drum 41b fixed to the input shaft 13 and a plurality of clutch discs 44 interchangeably provided between the clutch hub 41a and the clutch drum 41b. The first bypass clutch 41 is engaged by pressing the clutch discs 44 and the hollow shaft 43 is connected with the input shaft 13. Similarly, when the second bypass clutch 42 is engaged, a hollow shaft 45 on which the sixth drive gear 26a is fixed is connected with the input shaft 13.

A front drive shaft 46 is coaxially inserted in the hollow output shaft 14. The front drive shaft 46 is connected with the output shaft 14 through a center differential 48 and at the same time is connected with a front axle (not shown) through a front differential 48. The center differential 47 is connected with a rear drive shaft 49. The rear drive shaft 49 is connected with rear axle (not shown) through a rear differential (not shown) The front differential 48 is disposed below the reverse drive gear 27 as shown in FIG. 1.

Thus, the third drive gear 23a is rotatably mounted on the input shaft 13 and the third driven gear 23b is integrally mounted on the output shaft 14 in a meshing condition with the third drive gear 23a. Further, adjacently to the gear train of the third drive gear 23a and the third driven gear 23b, the reverse drive gear 27 is rotatably mounted on the input shaft 13 and meshes with the third driven gear 23b through the first and second idler gears 28a, 28b. The synchronizer hub 33a is provided between the third drive gear 23a and the reverse drive gear 27 to transmit power from the input shaft 13 to either the third drive gear 23a or the reverse drive gear 27 through the first bypass clutch 41. The synchronizer sleeve 33b is slidably provided around the synchronizer hub 33a to selectively transmit power adjacent drive gears 23a, 27. Accordingly, power is transmitted to the third drive gear 23a, the third driven gear 23b meshing with the third drive gear 23a rotates the output shaft 14 in a direction to move a vehicle forwardly. On the other hand, power is transmitted to the reverse drive gear 27, the third driven gear 23b receives power from two idler gears 28a, 28b and rotates the output shaft 14 in a direction to drive the vehicle backward.

Referring to FIG. 4, numeral 50 denotes a control valve unit in which a plurality of electromagnetic valves VA1 to VA9 change over or control hydraulic pressure of an oil pump 17 to actuate miscellaneous actuators. The control valve unit 50 is disposed below the output shaft 14 between the third driven gear 23b and the sixth driven gear 26b.

The first bypass clutch 41 is engaged by a first bypass clutch actuator 51 and the second bypass clutch 42 is engaged by a second bypass clutch actuator 52. The hydraulic pressure of working fluid is supplied to the first bypass clutch actuator 51 through an electromagnetic pressure control valve VA1 and on the other hand is supplied to the second bypass clutch actuator 52 through an electromagnetic pressure control valve VA2.

In the changeover mechanisms 31, 32 and 33, a select actuator 54 travels in a direction marked B by hydraulic pressure through two electromagnetic changeover valves VA3, VA4 and as a result an object synchronizer sleeve is selected from the synchronizer sleeves 31b, 32b and 33b. On the other hand, a shift actuator shifts in a direction marked C by hydraulic pressure through two electromagnetic pressure control valves VA5, VA6 and as a result a specified gear position is obtained.

The input clutch 20 is engaged by the assist of an input clutch actuator 55 whose hydraulic pressure is controlled by an electromagnetic pressure control valve VA7. In an engaged condition, the power of the turbine shaft 18 is transmitted to the input shaft 13 and in a disengaged condition, power transmission is shut off.

The torque converter 12 has a release chamber 56 and an apply chamber 57 partitioned by a lock-up clutch 16 from each other. When an electromagnetic pressure control valve VA8 supplies working fluid to the release chamber 56 and an electromagnetic pressure control valve VA9 releases working fluid from the apply chamber 57, the lock-up clutch 16 is released. On the other hand, when working fluid is supplied to the apply chamber 57 and is released from the release chamber 56, the lock-up clutch 16 is engaged.

Gearshift operations of thus constituted automatic transmission will be described.

The first gear is obtained by engaging the synchronizer sleeve 31b of the first changeover mechanism 31 with the spline 21c by operating the select actuator 54 and the shift actuator 53. The driving force of the input shaft 13 is transmitted to the output shaft 14 through the drive gear 21a, the driven gear 21b and the first changeover mechanism 31. Further, when the synchronizer sleeve 31b is engaged with the spline 22c, the gear is changed to the second gear. Similarly, the fourth gear and fifth gear are obtained by operating the second changeover mechanism 32.

The sixth gear is obtained by engaging the second bypass clutch 42 by operating the second bypass clutch actuator 52. The driving force is transmitted from the input shaft 13 to the output shaft 14 through the second bypass clutch 42, the drive gear 26a and the driven gear 26b.

On the other hand, the changeover between the third gear and the reverse gear is performed by operating the third changeover mechanism 33, while the first bypass clutch 41 is engaged and power is transmitted to the synchronizer hub 33a through the hollow shaft 43. When the third gear is obtained, the driving force is transmitted from the input shaft 13 to the output shaft 14 through the first bypass clutch 41, the third changeover mechanism 33, the drive gear 23a and the driven gear 23b. On the other hand, when the reverse gear is obtained, the driving force is transmitted from the input shaft 13 to the output shaft 14 through the first bypass clutch 41, the third changeover mechanism 33, the reverse drive gear 27, the first idler gear 28a, the second idler gear 28b and the driven gear 23b. The output shaft 14 rotates in a reverse direction to the forward gear train due to the rotational conversion by the idler gears 28a, 28b.

The respective changeover mechanism 31, 32 and 33 can hold the synchronizer sleeves 31b, 32b and 33b in a neutral condition, that is, a condition where the synchronizer sleeves 31b, 32b and 33b are not engaged with the spline 21c and the like. Therefore, there is no chance of synchronous engagement. When the sixth gear is obtained, all changeover mechanisms 31, 32 and 33 are in a neutral condition.

In the automatic transmission according to the present invention, in order to prevent so-called "torque drop" on gearshiftings, either of these two bypass clutches 41, 42 is engaged when the changeover mechanisms 31, 32 and 33 are in a neutral condition.

Further, when the gear is changed from neutral to forward, from neutral to reverse, from forward to reverse and from reverse to forward, first the input clutch 20 disposed between the turbine shaft 18 and the input shaft 13 is operated to shut off torque transmission and then the changeover operation is performed.

The automatic transmission is characterized in that since the third driven gear 23b serves as a reverse driven gear, a reverse driven gear can be abolished from the output shaft 14. As a result, the axial length of the output shaft 14 can be shortened. The shortened output shaft 14 brings miscellaneous advantages such as a short longitudinal length of the automatic transmission, shortened hydraulic passages and the like.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. An automatic transmission for a vehicle having a plurality of gear trains provided between an input shaft and an output shaft, comprising:
   a forward drive gear rotatably mounted on said input shaft;
   a forward driven gear integrally mourned on said output shaft and constantly meshing with said forward drive gear;
   a reverse drive gear rotatably mounted on said input shaft adjacently to said forward drive gear;
   a changeover hub integrally mounted on said input shaft between said forward drive gear and said reverse drive gear;
   an first idler gear constantly meshing with said reverse drive gear;
   a second idler gear integrally formed with said first idler gear and constantly meshing with said forward driven gear; and
   a changeover member provided between said forward drive gear and said reverse drive gear for engaging said changeover hub either with said forward drive gear or said reverse drive gear.

2. The automatic transmission according to claim 1, wherein said input shaft and said output shaft are arranged in a longitudinal direction of the vehicle and said reverse drive gear is disposed above a front differential.

3. An automatic transmission for a vehicle having a plurality of gear trains provided between an input shaft and an output shaft, comprising:
   a hollow shaft coaxially including said input shaft;
   a forward drive gear rotatably mounted on said hollow shaft;
   a forward driven gear integrally mounted on said output shaft and constantly meshing with said forward drive gear;
   a reverse drive gear rotatably mounted on said input shaft adjacently to said forward drive gear;
   a friction clutch provided between said input shaft and said hollow shaft for selectively transmitting power from said input shaft to said hollow shaft;
   a changeover hub integrally mounted on said hollow shaft between said forward drive gear and said reverse drive gear;
   an first idler gear constantly meshing with said reverse drive gear;
   a second idler gear integrally formed with said first idler gear and constantly meshing with said forward driven gear; and
   a changeover member provided between said forward drive gear and said reverse drive gear for engaging said changeover hub either with said forward drive gear or said reverse drive gear.

4. The automatic transmission according to claim 3, wherein said input shaft and said output shaft are arranged in a longitudinal direction of the vehicle and said reverse drive gear is disposed above a front differential.

* * * * *